Figure 1:
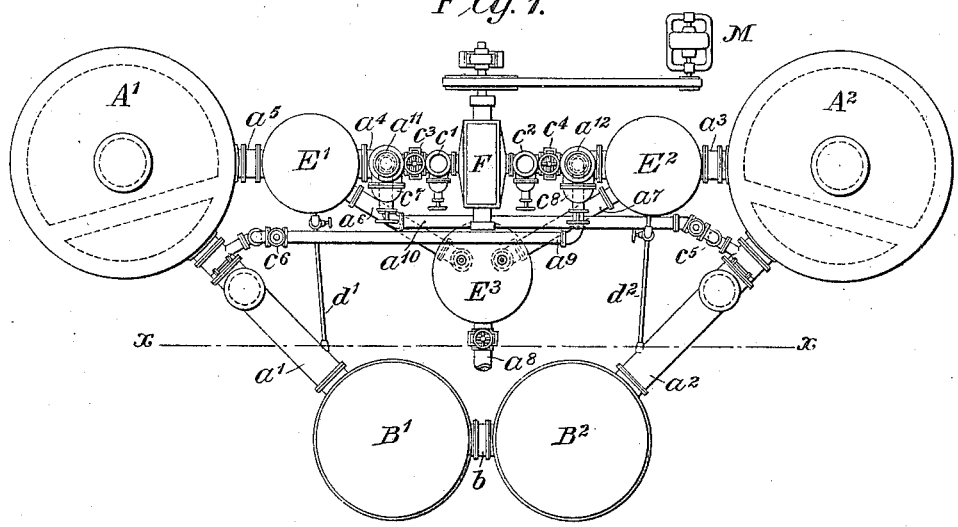

No. 680,785. Patented Aug. 20, 1901.
W. J. KNOX.
METHOD OF PRODUCING GAS.
(Application filed Nov. 12, 1900.)

(No Model.)

WITNESSES:
C. L. Belcher
Wm H. Capel

INVENTOR
William John Knox.
BY
Charles A. Terry
ATTORNEY.

UNITED STATES PATENT OFFICE.

WILLIAM JOHN KNOX, OF PITTSBURG, PENNSYLVANIA, ASSIGNOR TO GEORGE WESTINGHOUSE, OF SAME PLACE.

METHOD OF PRODUCING GAS.

SPECIFICATION forming part of Letters Patent No. 680,785, dated August 20, 1901.

Application filed November 12, 1900. Serial No. 36,266. (No specimens.)

*To all whom it may concern:*

Be it known that I, WILLIAM JOHN KNOX, a citizen of the United States, and a resident of Pittsburg, in the county of Allegheny and State of Pennsylvania, have invented certain new and useful Improvements in Methods of Producing Gas, of which the following is a specification.

My invention relates to a method of manufacturing gas.

The object of the invention is to provide a convenient method of operation for the economical production of gas.

The invention is particularly useful in the manufacture of fuel-gases containing a large proportion of water-gas; but I do not limit my claims to such uses. In the manufacture of such gases from bituminous coal I have found great economy in carrying on the process in two vessels or producers, one for making water-gas and the other for distilling off hydrocarbons. Economy of production requires also that an approximately uniform gas-making temperature should be maintained in these vessels—that is to say, a temperature corresponding to the temperature of reaction. The producers should be furnished with the correct proportions of steam and heat energy.

The general plan of carrying out my invention consists in circulating through the producers a large quantity of gas serving as a heat-carrier and in alternately cooling and heating the circulating gas, so that the gas shall enter the producers at a high temperature and deliver up heat to the contents of the producers and before it is returned to the heating apparatus cooling it to such a temperature that the end of the heating apparatus which it enters shall be maintained at a comparatively low temperature. The heating apparatus must be periodically reheated by the consumption of fuel, and that this may be done economically it is necessary that the end of it from which the products of combustion are delivered shall be kept at a moderate temperature; otherwise a large amount of heat would escape to the flues and thus be wasted. I have provided a convenient and efficient apparatus for heating up the stoves by burning gas produced in the system.

In another application I have described a system employing two producers and four stoves which are successively used as heating and heat-absorbing stoves. In the present application there is described a plant using but two stoves, and the construction and operation of this system will be described in connection with the accompanying drawings.

In this application I have claimed the process hereinbefore described. In another application, Serial No. 36,267, filed by me November 12, 1900, claims are made to the apparatus described herein.

Figure 2:
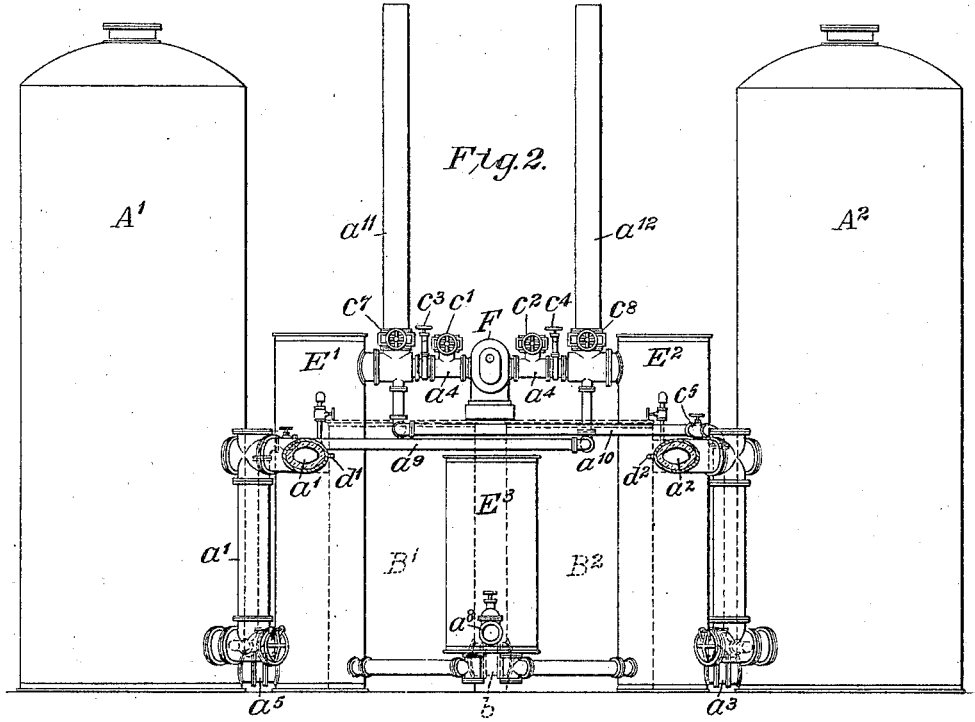

In the drawings, Figure 1 is a plan showing the general organization of the apparatus, and Fig. 2 is an elevation thereof.

Referring to the figures, $A'$ $A^2$ represent two stoves of any suitable character adapted to be heated by the combustion of gas supplied thereto in a manner to be described.

$B'$ $B^2$ represent two producers of any suitable character. These producers are connected together at their bottoms by a pipe $b$. The stove $A'$ is connected by a pipe $a'$ with the top of the producer $B'$, while the top of the producer $B^2$ is connected by a pipe $a^2$ with the stove $A^2$. I have also shown two economizers or steam-generators $E'$ and $E^2$. These are connected with each other by a pipe $a^4$, in the circuit of which there is inserted a fan F, adapted to be driven in either direction—as, for instance, by a motor M—for forcing a circulation from one economizer to the other, and vice versa. The stove $A^2$ is connected by a pipe $a^3$ with the economizer $E^2$, and the economizer $E'$ is connected by a pipe $a^5$ with the stove $A'$. A third economizer or scrubber $E^3$ is connected with both economizers $E'$ and $E^2$ by pipes $a^6$ $a^7$, respectively, and an outlet-pipe $a^8$ leads from this scrubber to a gas-holder, a gas-main, or a gas-consuming device. Branch pipes $a^9$ $a^{10}$ lead from the pipe $a^4$ to the stoves $A'$ and $A^2$, respectively, for supporting combustion in heating up the stoves or superheaters $A'$ and $A^2$. The connection of the pipe $a^9$ with the pipe $a^4$ is adjacent to the economizer $E^2$, while the connection of the pipe $a^{10}$ is adjacent to the economizer $E'$. The connection of pipes $a^9$ $a^{10}$ with the respective superheaters $A'$ $A^2$ is through the pipes $a'$ $a^2$. These pipes $a^9$ $a^{10}$ serve as air-blast pipes for supplying air for the combustion of gas for heating up the respective stoves. Suitable air-inlet pipes and valves are provided in the pipe $a^4$, as indicated at $c'$ and $c^2$. Valves $c^3$ and $c^4$ are also inserted in the pipe $a^4$ for controlling its openings, and valves $c^5$ $c^6$ control the openings of the pipes $a^9$ and $a^{10}$. Valves $c^7$ and $c^8$ control the openings of the pipes $a^{11}$ and $a^{12}$, through which the products of combustion escape from the stoves A' and $A^2$, respectively, when they are being heated up.

The operation of this apparatus is as follows: The system is started in operation by first building a fire in one of the producers—B', for instance. Then the valve $c^3$ is closed and the valves $c'$ and $c^7$ are opened. Then by starting the fan in the direction to force the air within the pipes toward the economizer $E^2$ air is drawn in through the valve $c'$, and passing through the fan a portion is forced through the economizer $E^2$ into the stove $A^2$ and thence through the two producers $B^2$ and B' to the stove A'. In passing through the producer B' producer-gas is generated. Meanwhile the valve $a^6$ being opened, the requisite portion of air is forced through the pipe $a^9$ to the stove A', where it furnishes oxygen for the combustion of the producer-gas which is being received from the producer B'. This gas is burned in the stove A', and the products of combustion pass out at the cold end through the pipe $a^5$ to the economizer $E'$, and thence out to the atmosphere through valve $c^7$ and pipe $a^{11}$. This is continued until the requisite heat is given to the stove A'. Then for the purpose of heating up the stove $A^2$ the valve $c^3$ is opened, and valves $c'$, $c^4$, $c^6$, and $c^7$ are closed. The valves $c^2$, $c^3$, and $c^5$ are then opened, and the direction of the motion of the fan F is reversed. Thereupon the stove $A^2$ will be heated up in precisely the same manner described with reference to the stove A', producer-gas being burned in the stove $A^2$. In starting up the producer B' may be charged with more than sufficient fuel for heating up both stoves, so that there will be sufficient coke left in this producer after the heating of the two stoves to commence the subsequent gas-making operation. When the stoves have been thus heated, all the valves are closed with the exception of $c^3$ and $c^4$, thus connecting the two stoves, the two producers, and the two economizers in a closed circuit. The fan is then driven in either direction which may be selected—as, for instance, in such direction as to force the contents of the pipes through the stove A' and from that stove into the producers. The gas being received from the producers B' $B^2$ through the stove $A^2$ and economizers $E^2$ and E' entering the stove A' when it is cold becomes heated, and passing out at the hot end enters the producer B' at the top. A steam-pipe $d'$ leads from the economizer E' to the pipe $a'$ or to the producer B', and a similar steam-pipe $d^2$ connects the economizer $E^2$ with the pipe $a^2$ or the producer $B^2$. These pipes are for the purpose of furnishing steam for water-gas making. The heated gas and steam passing downward through the producer B', which contains coke, forms water-gas, and this enters the producer $B^2$ at the bottom and passing upward through the coal contained therein distills off the hydrocarbons and passes off through the pipe $a^2$ into the hot end of the stove $A^2$, where the gases are fixed by the heat of this stove. In the heating up the producer B' will have been left with a charge of coke, assuming that that producer was the one originally charged. Then as the operation proceeds coal is fed into the producer $B^2$, and this is gradually reduced to coke while the coke in the producer B' is being consumed in making water-gas, and when the producer B' is thus practically emptied the producer $B^2$ has been filled with coke by the destructive distillation of the coal continuously fed into it. In passing through the stove $A^2$ the gas is cooled and the larger part of the remaining sensible heat is stored up and subesquently returned to the producers when the circulation is reversed. Then it passes through the pipe $a^3$ to the economizer $E^2$, containing water, to which it delivers the remainder of the heat, thus conserving such heat. It passes thence through the pipe $a^4$ to the economizer E'. A portion of the gas is then drawn off through the pipe $a^6$ to the scrubber or economizer $E^3$, and thence through the pipe $a^8$ to a holder or service pipe. The remainder of the gas passes from the economizer E' back to the stove A' and continues its circulation, as already described. The gas is thus raised to a maximum temperature by the stove A' and is reduced to its minimum temperature before entering that stove. The heat which is not extracted from the gas by the stove $A^2$, however, is yielded up in the economizer, being utilized in forming steam for delivery to the producers, and the heat which is delivered up into the stove $A^2$ is returned to the producers in the subsequent step in the process—that is to say, when the direction of the circulation is reversed. When the stove A' has fallen in temperature to such a degree that the heat delivered by it to the gas is insufficient to maintain the producers in an efficient gas-making condition, the stove $A^2$ is again heated up to the maximum temperature in the manner already described, and then the direction of the fan F is reversed and the process is continued by causing the circulation to take place from the fan to the economizer $E^2$, the stove $A^2$, then through the producers to the stove A' and to the economizer E'. The excess of gas is then drawn off through the pipe $a^7$ and the scrubber $E^3$, the amount being controlled by the valve $a^8$. The operation of the apparatus then proceeds in regular periods of alternation, the next operation after the one described being the heating up of stove A' by blowing air through the producers and generating producer-gas. This operation does not involve any change in the direction of rotation of the fan. The next operation will consist in the reversal of the fan and circulation of the gas through superheater A', producers B' B², and absorbing or cooling stove A² in the escape of a portion of the produced gases through economizer E³, the necessary changes in valves being understood. In passing through the steam-economizers or steam-generators the temperature of the gas is reduced to, say, about 212° Fahrenheit or to such temperature as the products of combustion escaping from the stoves when they are heated by the combustion of the fuel may be allowed to leave without too great a waste of heat. There is constantly being drawn off an amount of gas dependent upon that which is being generated, and an approximately fixed quantity is kept in circulation, carrying heat from the stove into the producers and maintaining the requisite temperature for carrying on the gas-making processes therein.

In the foregoing description I have referred to the apparatus as including economizers E' E² in the circuit. I wish to have it distinctly understood, however, that it is not always necessary to employ economizers or steam-generators, such as E' E², for by properly proportioning the stoves A' A² the stoves themselves may be made to abstract from the gas and to conserve sufficient of the heat to render the apparatus highly economical and efficient without the aid of the supplemental devices or steam-generators E' E².

It will be now understood that by increasing the size of the stoves the temperature of the gas passing through a stove from the producers may be lowered in the stove to such a degree that it will pass out from that stove at the desired low temperature and the cold end of each stove maintained at the requisite temperature.

An important advantage of this system resides in the fact that no valves are required except those in relatively cold pipes. Moreover, low temperatures at the cold ends of the stoves are insured, because the air used in blowing up will enter the stove at atmospheric temperature. This results in high efficiency in the consumption of fuel. In each successive operation of generating gas the process will start with a very hot producer suited to water-gas making, because of the previous blowing up with air.

It requires but a short time to heat up the stoves when once the system has been set in operation, because the entire system is already at a high temperature, and hot air is used to generate the producer-gas employed for heating up the stoves. Therefore the unproductive periods of the plant are relatively short.

This process produces a gas containing practically all of the hydrocarbon, as the stoves are heated up with dry producer-gas made from the coke remaining in the producer after the coal has been distilled during the gas-making period.

The invention claimed is—

1. The process of operating a gas-producing plant which consists in manufacturing gas by circulating gas through a heating device and into the producer, thence through a heat-absorbing device, thereafter heating the heat-absorbing device by forcing air through the heating device and into the producer, thereby forming producer-gas, delivering the producer-gas to the heat-absorbing device and burning it therein.

2. The process of operating a gas-producing plant which consists in manufacturing gas by circulating gas through a heating device and into the producer, thence through a heat-absorbing device, thereafter heating the heat-absorbing device by forcing air through the heating device and into the producer, thereby forming producer-gas, delivering the producer-gas to the heat-absorbing device and burning it therein, and then using the heat-absorbing device as a heating device and circulating gas through the producer in the opposite direction and cooling the gas from the producer in the device previously used as a heating device.

3. The hereinbefore-described process of manufacturing gas which consists in circulating gas through a heating-stove and through a producer, passing the gas from the producer through a second stove, continuing the process until the first stove has partially cooled, thereupon supplying additional heat to the system by forcing a supply of air directly into the second stove and simultaneously forcing a supply of air through the first stove into the producer and delivering produced gas therefrom, to the second stove and burning the same in conjunction with the said air.

4. The hereinbefore-described process of manufacturing gas which consists in circulating gas through a heating-stove into the producer, passing the gas delivered from the producer through a second stove until the first stove has partially cooled, thereupon forcing air into the producer then passing the gas produced thereby into the second stove and forcing additional air directly into the second stove, burning the air and gas thus delivered to the second stove, and delivering the products of combustion to the atmosphere.

5. The hereinbefore-described process of manufacturing gas which consists in forcing a circulation through heating devices and producing devices in opposite direction alternately and in supplying the heat necessary to restore the heating devices to their requisite temperature by delivering thereto, for combustion, gas produced in the system during the intervals between the productive operation of the plant.

6. The hereinbefore-described process of generating water-gas which consists in forcing a circulation of gas through a heating device into the producer and simultaneously supplying the necessary steam to the producer and thereafter restoring the heating device to its proper temperature by generating producer-gas within the system and burning the same within the heating device.

7. The hereinbefore-described process of generating water-gas which consists in forcing a circulation of gas through a heating device, the producer and a heat-absorbing device in series, until the heating device has partially cooled, thereafter raising the heat-absorbing device to the proper temperature to act as a heating device by forcing air through the producer thereby generating producer-gas and burning the same in the heat-absorbing device and thereafter forcing a circulation of gas in the opposite direction through the system thereby utilizing the heat-absorbing device as a heating device and the heating device as a heat-absorbing device.

Signed at Pittsburg, in the county of Allegheny and State of Pennsylvania, this 7th day of November, A. D. 1900.

WILLIAM JOHN KNOX.

Witnesses:
J. A. ADAMS,
R. J. BRATTON.